United States Patent

Machida et al.

[11] Patent Number: 6,122,257
[45] Date of Patent: Sep. 19, 2000

[54] METHOD FOR COLLECTING INFORMATION ABOUT PHYSICAL CONSTITUTION OF LAN SYSTEM, METHOD OF SPECIFYING COLLISION TERMINALS, AND METHOD FOR DETECTING NOISE-GENERATED POSITION

[75] Inventors: Naoyoshi Machida; Toshihito Ochi; Hiromi Kawaguchi, all of Yokohama; Mineo Ogino, Tokyo; Masahiko Kurata, Yokohama; Masato Tachibana, Yokohama; Tadayuki Ichiba, Yokohama, all of Japan

[73] Assignees: Hitachi Electronics Services Co, Ltd, Kanagawa-ken; Link Laboratory Inc., Tokyo, both of Japan

[21] Appl. No.: 08/815,854
[22] PCT Filed: Sep. 12, 1995
[86] PCT No.: PCT/JP95/01803
  § 371 Date: Mar. 12, 1997
  § 102(e) Date: Mar. 12, 1997
[87] PCT Pub. No.: WO96/08897
  PCT Pub. Date: Mar. 21, 1996

Related U.S. Application Data

[63] Continuation of application No. 08/664,258, Jun. 7, 1996, abandoned.

[30] Foreign Application Priority Data

Sep. 12, 1994 [JP] Japan .................................. 6-216972

[51] Int. Cl.[7] .............................. H04J 1/16; G01S 13/32
[52] U.S. Cl. .................................. 370/252; 342/125
[58] Field of Search .................................. 370/245, 248, 370/252, 445, 451, 452, 257, 249; 395/180, 181, 182.02, 183.01; 342/125

[56] References Cited

U.S. PATENT DOCUMENTS

| | | | |
|---|---|---|---|
| 5,048,009 | 9/1991 | Conrad | 370/445 |
| 5,226,036 | 7/1993 | Riley et al. | 370/252 |
| 5,577,023 | 11/1996 | Marum et al. | 370/445 |

*Primary Examiner*—Huy D. Vu
*Assistant Examiner*—Chiho A. Lee
*Attorney, Agent, or Firm*—Antonelli, Terry, Stout & Kraus, LLP

[57] ABSTRACT

In a bus type LAN, the data transmitted from a terminal (14) is detected by an adapter (1) connected to one end of a bus (3), and in response thereto the adapter (1) transmits a pulse signal onto the bus (3). An adapter (2) connected to the other end of the bus (3) receives the data transmitted from the terminal (14) and detects its source terminal address. A difference in time between the arrival of the data from the terminal (14) and the arrival of the pulse signal from the adapter (1) is measured by a counter circuit (21), and the count value obtained is stored in a memory (23), forming a pair with the corresponding source terminal address. Thus, the count value can be obtained for each terminal during the normal operation of the LAN. The data of the memory (23) are extracted by a personal computer (5), where the physical position of each terminal is calculated in accordance with the bus propagation velocity, and is displayed or printed out as a physical constitution diagram. Also, the packet signal, its collision signal, the jam signal and the pulse signal are utilized to measure the difference in time for the arrival of the pulse signal and so forth, to thereby specify the terminal having caused the packet collision.

14 Claims, 11 Drawing Sheets

FIG. 11
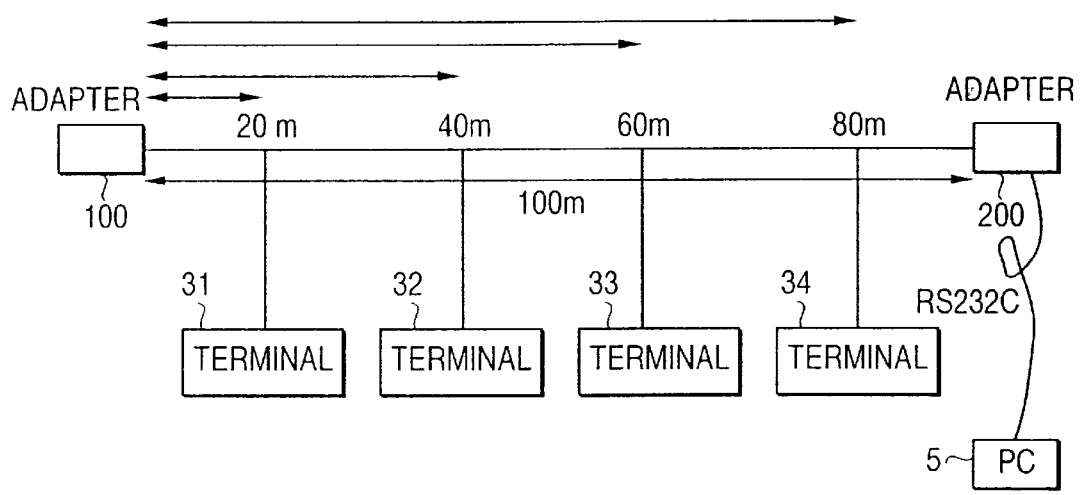
FIG. 12(a)
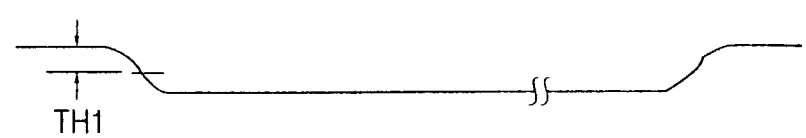
FIG. 12(b)
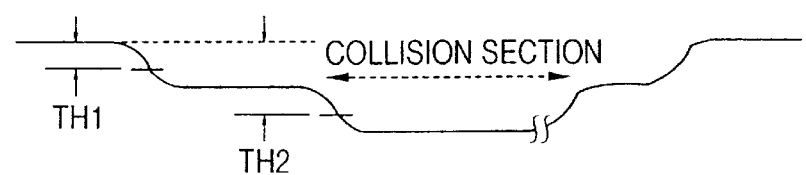
FIG. 12(c)

METHOD FOR COLLECTING INFORMATION ABOUT PHYSICAL CONSTITUTION OF LAN SYSTEM, METHOD OF SPECIFYING COLLISION TERMINALS, AND METHOD FOR DETECTING NOISE-GENERATED POSITION

The application is a 371 of PCT/JP95/01803 Sep. 12, 1995 and continuation of application Ser. No. 08/664,258 filed Jun. 7, 1996 abd.

TECHNICAL FIELD

This invention relates to a local area network (LAN) system, and more particularly to a system for automatically collecting its physical constitution information to prepare a physical configuration diagram. It also relates to the specifying of collision terminals, i.e., terminals which transmitted the data that collided, and the detecting of noise-generated position in the LAN system.

BACKGROUND ART

When LAN systems are checked for maintenance, it is insufficient simply to recognize its physical constitution, and it is also necessary to recognize (a) what terminal device (hereinafter often simply "terminal(s)") is connected to what position (how many meters it is distant from an end) of a LAN cable, and (b) whether the distance between terminals is as standardized. The information on (a) is information especially necessary to pinpoint the cause of faults.

As documents with which maintenance staffs recognize and manage such information, physical constitution diagrams of LAN have been manually prepared in the past.

Now, in LAN systems, it is relatively frequent to change a system configuration, e.g., to add or eliminate terminals and cables. For making such changes, it is cumbersome to manually adjust documents such as the physical constitution diagrams every time. There is also a possibility of making mistakes.

Moreover, such work is often carried out as secondary business, and hence is often not accomplished. Under existing circumstances, maintenance staff may only realize the importance of documents such as the diagrams for the first time when the LAN system causes problems.

A LAN system usually employing a collision detection type carrier sense multiple access CSMA/CD (IEEE 802.3) as an access control system is operated by algorithms with the assumption that some data transmitted from a plurality of terminals may collide with each other. In general, the occurrence of collision increases with increase in utilization, resulting in extreme lowering of the performance of LAN systems. However, it can only be assumed from the utilization of each terminal data transmitted from what terminal have caused or tend to cause collision. Especially in the case of collision due to defective physical layers of a LAN, it takes a lot of time to cut and divide the defective portions. Especially when the defective physical layers occur intermittently, it takes a long time to resolve the problems.

Electrical noise that may come over LAN cables also makes LAN throughput lower or makes a LAN system inoperable. With regard to such noise, no means is available for assuming the point where the noise has been generated, and it takes a long time to cope with it.

The present invention was made taking account of these problems. Accordingly, an object of the present invention is to provide a method and apparatus that can automatically collect the physical constitution information of LAN systems.

Another object of the present invention is to provide a system that can automatically prepare physical constitution diagrams of LAN systems by the use of such an apparatus.

Still another object of the present invention is to provide an apparatus that can ascertain the state of a LAN system with ease by specifying terminals having caused a collision of transmitted data when a LAN system is operated or detecting the position at which the noise is generated, and by keeping such terminals or noise-generated position on record even if it can not recognize the address of a packet transmitted over the LAN.

DISCLOSURE OF THE INVENTION

To achieve the above objects, the method of collecting physical constitution information of a LAN system according to the present invention is a method of collecting physical constitution information in a bus type LAN system to which at least two terminal devices are connected; the method comprising;

detecting at one end of the bus the data transmitted from a terminal device, to generate a pulse signal on the bus;

measuring at the other end of the bus a difference in time from which when the data transmitted from the terminal device are received until the pulse signal is received; and determining the position where the terminal device is connected on the bus, in accordance with the time difference obtained by this measurement and a known bus propagation velocity.

The apparatus for collecting physical constitution information of a LAN system according to the present invention is an apparatus for automatically collecting physical constitution information in a bus type LAN system to which at least two terminal devices are connected; the apparatus comprising a first adapter connected to one end of the bus and a second adapter connected to the other end of the bus;

the first adapter having at least a circuit for receiving the data transmitted from each terminal device and a pulse transmitting circuit for transmitting onto the bus a preset pulse signal in accordance with the reception of the transmitted data; and the second adapter having at least a circuit for receiving the data transmitted from each terminal device, a circuit for detecting a source terminal device address contained in the transmitted data thus received, a pulse detecting circuit for detecting the pulse signal transmitted from the pulse transmitting circuit of the first adapter, a counter circuit for measuring a difference in time between the arrival of the data transmitted from the terminal device and the arrival of the pulse signal transmitted from the first adapter, and a memory for storing the count value of the counter circuit together with the corresponding source terminal device address.

In the present invention, such an apparatus for collecting the physical constitution information of a LAN system may be combined with an existing computer to make up a system for preparing physical constitution diagrams.

Thus, the first and second adapters respectively having a specific constitution are provided on both ends of the bus of a bus type LAN system so that the physical constitution information is automatically collected through the operation of the LAN system. More specifically, every time the one terminal connected to a LAN transmits data on the bus toward the other terminal, the data corresponding to the position at which the terminal is connected on the bus are automatically incorporated by the operation of the first and second adapters. This makes it possible to collect the physical constitution information through a normal operation of the LAN system without stopping the operation of the LAN. The information thus collected is temporarily stored in the memory provided in the second adapter and is taken out of the external computer when necessary, to calculate the respective positions on the bus at which the terminal devices are connected, in accordance with the known bus propagation velocity. On the computer, physical constitution diagrams formed of graphic and character data are prepared in accordance with the terminal-connected positions on the bus thus calculated, and are displayed or printed out.

The system thus made up makes it unnecessary to manually manage the physical constitution of LAN systems as conventionally done or to manually prepare the configuration diagrams.

The first and second adapters can also be set up by hardware only without internally providing microcomputers, and hence can be produced at a relatively low cost.

The method of specifying the collision terminals in a LAN system according to the present invention is a method of specifying first and second terminal devices that have transmitted first and second packets having caused a collision in a bus type LAN system to which at least three terminal devices that can transmit packets onto the bus are connected and which transmits a jam signal having a preset data length when the packets transmitted from first and second terminal devices among the terminal devices collide on the bus and the terminal device having transmitted the packet having collided receives a collision signal; the method comprising;

providing first and second adapters at both ends of the bus; the first adapter being provided to generate a first preset pulse signal when the collision signal is detected and then generate a second preset pulse signal when the termination of the jam signal is detected, and the second adapter being provided to measure a first time α from the termination of the collision signal being detected until the termination of the jam signal is detected, a second time β until the first pulse signal is received and a third time γ until the second pulse signal is received;

determining a first distance on the bus, extending from the first adapter to one of the first and second terminal devices, in accordance with a difference (β−α) between the second time and the first time and the known bus propagation velocity and at the same time determining a second distance on the bus, extending from the first adapter to the other of the first and second terminal devices, in accordance with the third time γ and the bus propagation velocity; and comparing the first and second distances thus determined, with each known terminal-connected position on the bus, of the aforesaid at least three terminal devices to specify which are the first and second terminal devices among at least three terminal devices.

The present invention also provides an apparatus for carrying out the method of specifying the collision terminal.

The method of detecting the noise-generated position according to the present invention is a method of detecting the position at which electrical noise has been generated on the bus in a bus type LAN system; the method comprising;

providing first and second adapters at both ends of the bus; the first adapter being provided to generate a preset pulse signal when the termination of noise is detected after the noise has been detected, and the second adapter being provided to measure a time from the termination of the noise being detected until the pulse signal is received, after the noise has been detected; and calculating the distance on the bus, extending from the first adapter to the noise-generated position, in accordance with the time thus measured and the bus propagation velocity.

The present invention also provides an apparatus for carrying out the method of detecting the noise-generated position.

BRIEF DESCRIPTION OF THE DRAWINGS

FIG. 11 illustrates an example of the configuration of a specific LAN.

FIG. 12 illustrates signal waveforms on a LAN cable.

BEST MODES FOR WORKING THE INVENTION

Preferred embodiments of the present invention will be described below in detail with reference to the drawings. Here, an example is shown in which the present invention is applied to a bus type LAN system employing a coaxial cable as a communication path.

First, the principle of how the physical constitution of a LAN is detected in the present invention will be described with reference to FIG. 6.

Figure 6:
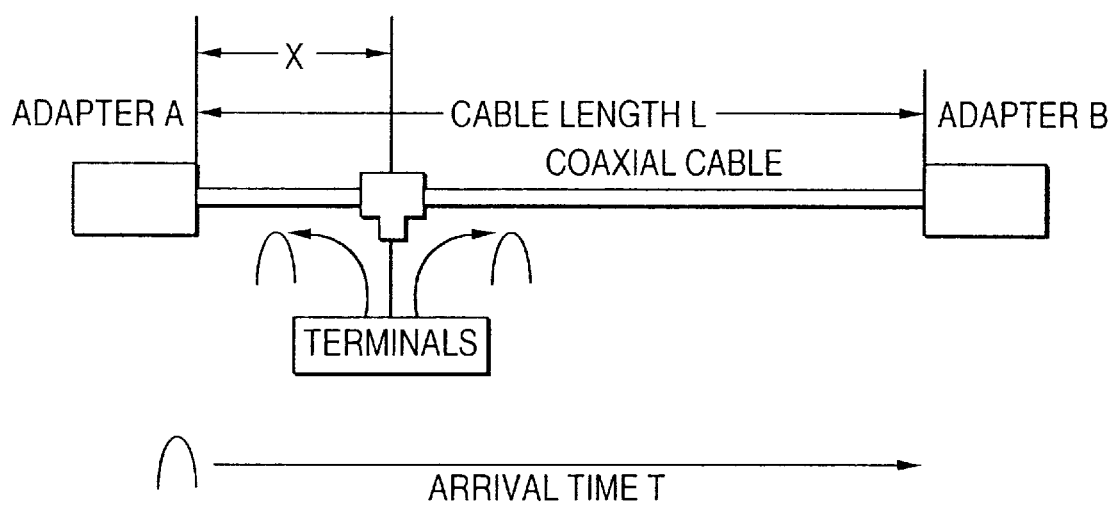
FIG. 6 illustrates the principle of the present invention.

Now, as shown in FIG. 6, a terminal is connected at a desired position in the middle of a coaxial cable having a whole length L (the position located at a distance x from one end of the cable). Both ends of the cable are usually terminated with terminal resistances so that the reflection of signals can be prevented. In the present invention, adapters A and B for automatically receiving physical constitution information therein, internally provided with terminal circuits, are respectively provided at both ends of the coaxial cable. The position (distance x) of the terminal is determined in the following manner.

The signal propagation velocity of the coaxial cable is set as a known value, and the time taken before a pulse signal transmitted from one adapter is reflected on the other adapter side and returns to the one adapter is measured to thereby determine the cable length. Here, in order to cause the reflection of signals on the other adapter side, its end is intentionally kept open.

(1) A pulse signal is injected from the terminal into the cable. In practice, a data frame used in communication made, through a conventional LAN is used as this pulse signal.

(2) The adapter A injects the pulse signal into the cable immediately after it receives the pulse signal transmitted from the terminal.

(3) The adapter B measures the difference in time between the arrival of the pulse signal transmitted from the terminal and the arrival of the pulse signal transmitted from the adapter A. This time difference corresponds to the time for which the pulse signal reciprocates through the distance x. Since as stated above the propagation velocity of the pulse signal is known, the distance x is determined from this arrival time difference.

Figure 1:
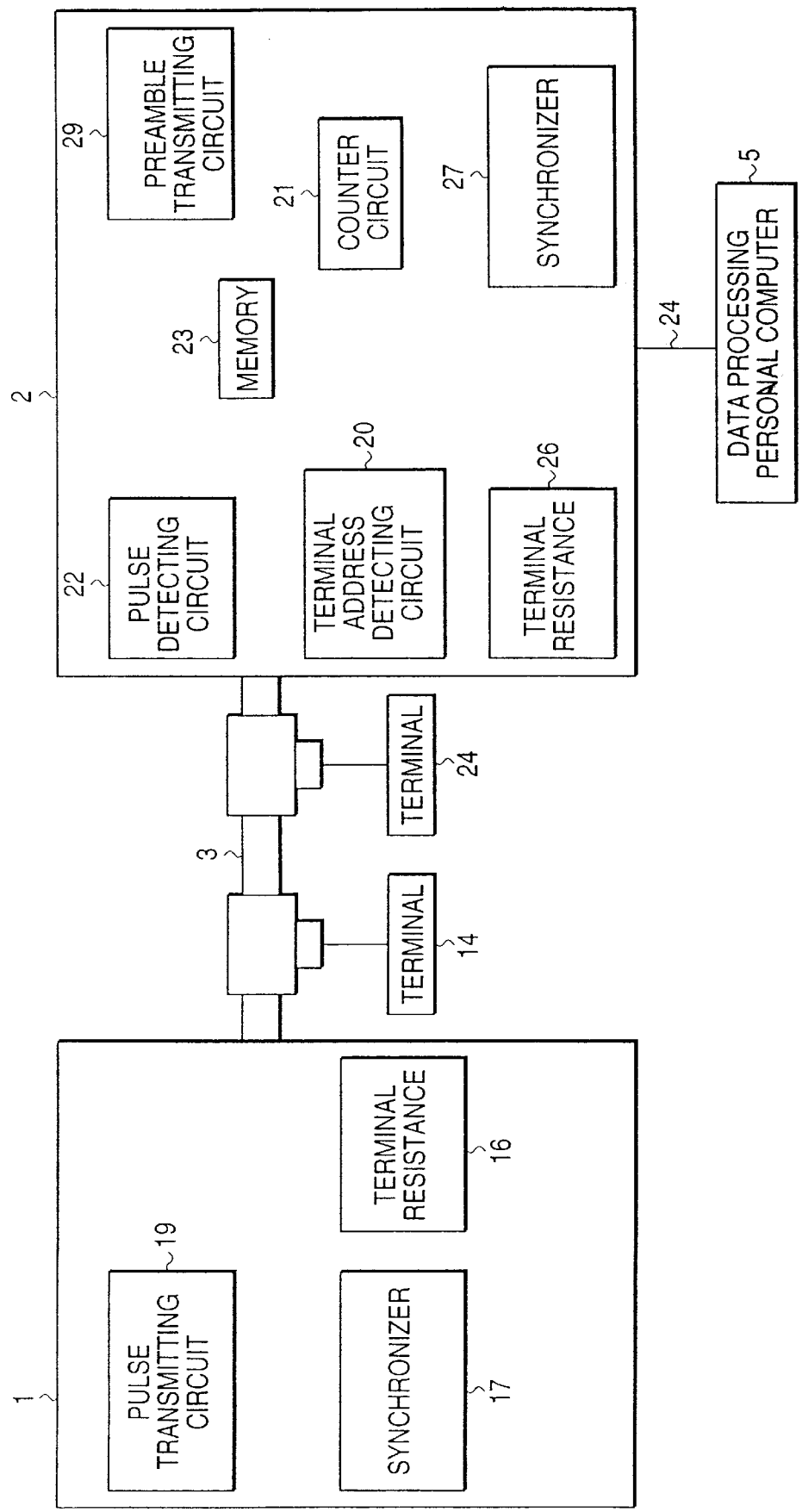
FIG. 1 is a block diagram showing an example of the configuration of a LAN and physical constitution diagram preparation system to which the present invention is applied.

Now, an example of the constitution of a system for preparing a LAN physical constitution diagram according to the present invention is shown in FIG. 1. This LAN is a bus type LAN (e.g., Ethernet) making use of a coaxial cable (3C2V). More specifically, in this example, an Ethernet bus 3 is connected with two sets of terminals 14 and 24, and respectively connected with adapters 1 and 2 at both ends of the bus 3. Stated strictly, the physical constitution diagram preparation system of the present invention is constituted of the adapters 1 and 2 and a data processing personal computer (PC) 5 connected to the adapters. The adapters 1 and 2 are connected to both ends of the bus when the LAN system is set up.

The adapter 1 has, in addition to a terminal resistance 16, a synchronizer 17 and a pulse transmitting circuit 19. The adapter 2 has, in addition to a terminal resistance 26, a terminal address detecting circuit 20, a counter circuit 21, a pulse detecting circuit 22, a memory 23, a synchronizer 27 and a preamble transmitting circuit 29. The adapter 2 is connected with the PC 5 through an RC232C cable 24. In the present example, the adapters 1 and 2 are both provided with no microcomputer internally, and are made up only of hardware. The respective constituents in the adapters are operated in a manner which will be described later. The PC 5, which need not be described in detail, has as usual a data communicating means (such as a modem), a processing means (a processor), a display means (a display device) and a printing means (a printer).

How the system shown in FIG. 1 operates will be described below.

Figure 3:
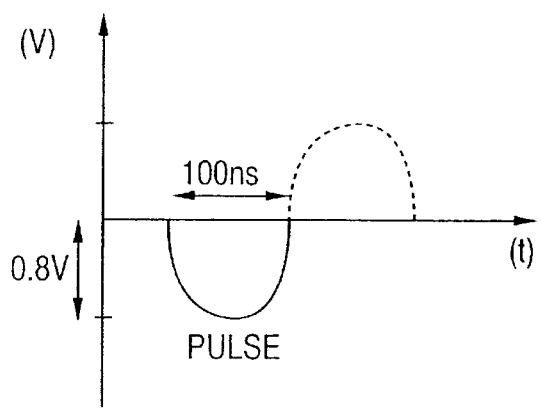
FIG. 3 illustrates a wave form showing how the pulse transmitted from the adapter shown in FIG. 1 is made up.
Figure 4:
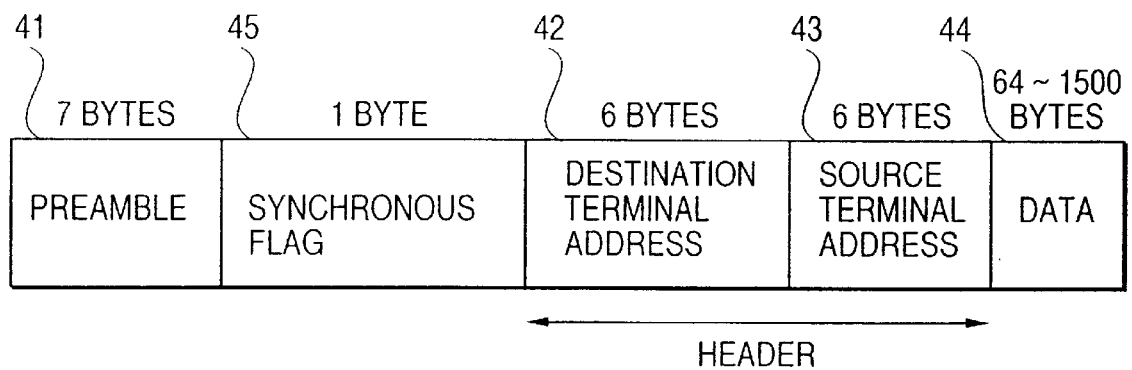
FIG. 4 is a format diagram showing a format of the data transmitted from the terminal shown in FIG. 1.
Figure 7:
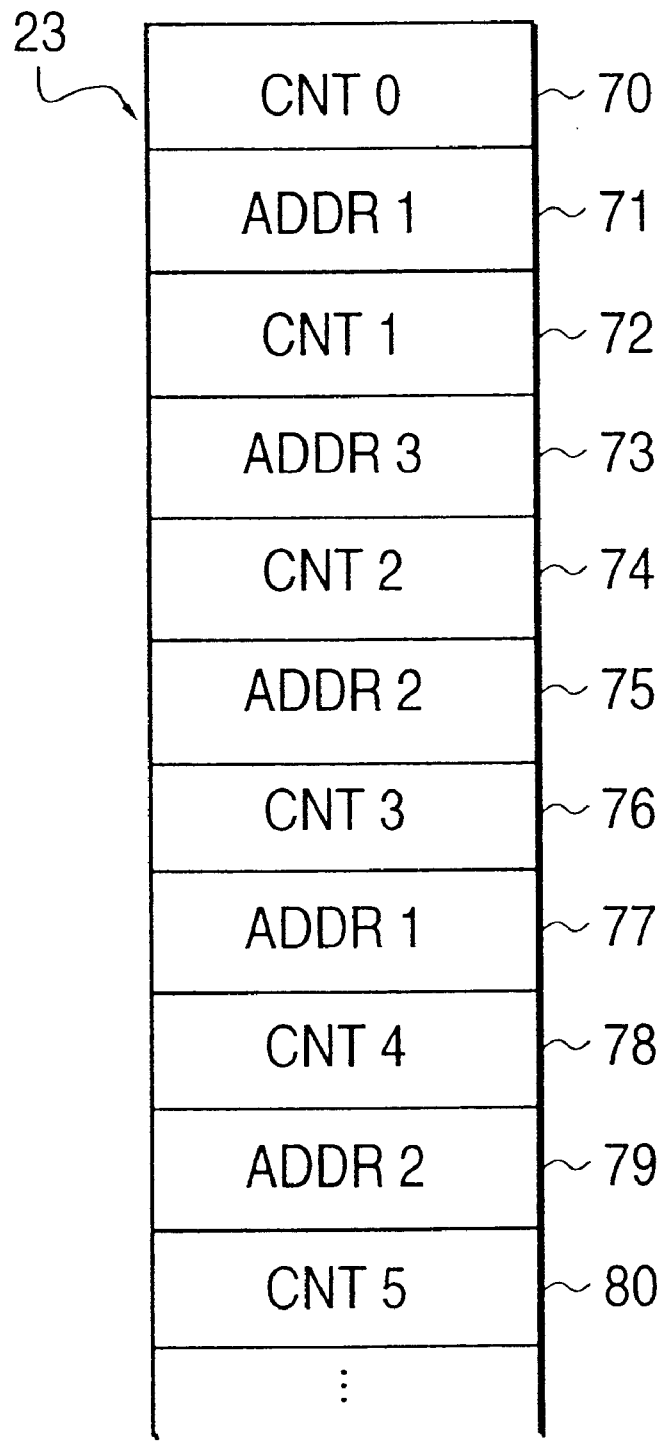
FIG. 7 illustrates storage areas of the memory shown in FIG. 1.

Before the positions where the individual terminals are connected are detected, the whole length L of the bus is first determined. For that purpose, a preamble is injected from the preamble transmitting circuit 29 of the adapter 2 onto the bus. This preamble is the same as a preamble attached to the head of the data frame used at the time of communication as shown in FIG. 4. The adapter 1 detects the preamble according to the principle of measurement described above, and, immediately after the termination of the preamble, injects onto the cable the pulse as shown in FIG. 3. This pulse is detected by the pulse detecting circuit 22. The adapter 2 transmits the preamble and then measures, by means of the counter circuit 21, the time taken before the pulse is received. In this example, the counter circuit 21 counts clocks of 10 ns (nanoseconds). Hence, one count corresponds to 10 ns. The 10 ns also corresponds to the propagation time for which a signal reciprocates through 1 m of the bus made of a coaxial cable. For example, when the time determined is N count=10 N nanoseconds, its length corresponds to N/2 m. In this way, the whole length L between the bus adapters 1 and 2 is determined. The adapter 2 stores in the memory 23 a count value CNT0 determined as described above. How this count is stored is shown in FIG. 7. The CNT0 is stored in a memory area 70 of the memory.

Next, the position of each terminal is determined.

During the operation of the LAN system, the data are transmitted and received between the terminals. On the bus 3, only data for one terminal are present at a time when no collision of data occurs. The data format of the data transmitted from a certain terminal is as shown in FIG. 4. More specifically, the transmitted data are comprised of a synchronizing preamble 41 (7 bytes), a destination terminal address 42 (6 bytes), a source terminal address 43 (6 bytes), transmitted data 44 (64 to 1,500 bytes) and a synchronous flag 45 (1 byte). The terminal addresses 42 and 43 constitute the header. Taking synchronization with the synchronous flag 45, the header, it has a fixed length, can take out the source terminal address in the adapter 2, as will be described later, in accordance with the number of received bytes.

Figure 2:
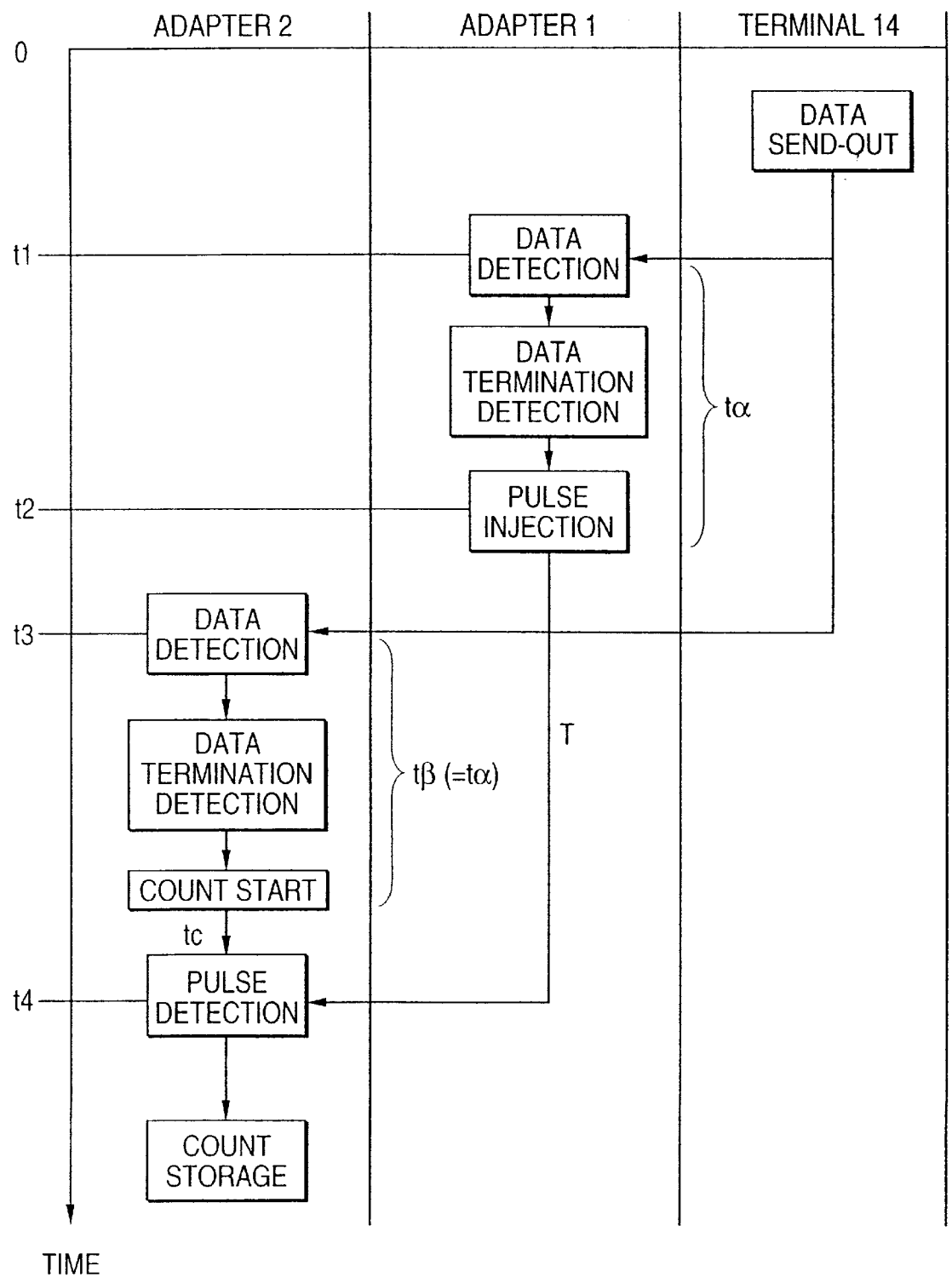
FIG. 2 illustrates the timing of operation in the system shown in FIG. 1.

Now, assume that in FIG. 1 the data are sent out from the terminal 14 to the terminal 24. A timing diagram applicable in this instance is shown in FIG. 2. As a matter of course, the data are received in the terminal 24. Since, however, this is not directly concerned with the present invention, how the terminal 24 operates is not shown in FIG. 2. In FIG. 2, the point of time when the terminal 14 sends out the data is regarded as time 0, and the time lapses downward in the longitudinal direction.

In the example shown in FIG. 1, the data transmitted from the terminal 14 first reach the adapter 1. The adapter 1 detects the data while synchronizing the received data with the synchronous flag 45 (FIG. 4) by its synchronizer 17. The adapter 1, immediately after the termination of data is detected, injects a negative pulse as shown in FIG. 3 (half-wave sinusoidal wave: 100 s in width, 0.8 V in amplitude), into the bus 3 through the pulse transmitting circuit 19 (FIG. 2, t2).

Thus, since in JIS X5252 the interval between the data and the data is prescribed to be at least 9.6 $\mu$s, the pulse may be transmitted and received while the bus of the LAN is empty after the termination of the data is detected, whereby this pulse can be transmitted and received without affecting the transmission and reception of data between the terminals at all.

Meanwhile, the adapter 2 detects the data transmitted from the terminal 14 (FIG. 2, t3) while similarly synchronizing the received data with the synchronous flag 45 by its synchronizer 27, and, after the termination of data is detected, starts count operation of the counter circuit 21. In parallel to this operation, the source terminal address (in this instance, the address of the terminal 14) of the received data in the header (FIG. 4) is detected by the terminal address detecting circuit 20 and the detected data are stored in the memory 23 at its stated position. An IP address and so forth put in the data portion 44 shown in FIG. 4 can also be stored therein. Thereafter, the pulse transmitted from the adapter 1 is detected by the pulse detecting circuit 22 (FIG. 2, t4). At this point in time, the count operation of the counter circuit 21 is stopped. This count value is stored in the memory 23, forming a pair with the source terminal address previously stored. This state is shown in FIG. 7 as memory positions 71 and 72.

In conventional LAN system operation, the data are transmitted from each terminal, and hence the data may be collected for a certain period (e.g., for a week), whereby count values are determined with respect to all the terminals (FIG. 7, 71 to 80). As in the case of the memory positions 71/72 and 77/78, it is possible that the data on the same terminal are superimposed and taken into the memory. The overlapped data of the terminal are discarded later when the data of the memory 23 are extracted with the PC 5. In place of this, with regard to the same terminal address, the hardware may be set up so as to discard the second and subsequent data or to average data added to the previous data, in order to save the memory areas used in the memory 23.

The manner of storing the data as shown in FIG. 7 is only an example. For example, so long as the addresses (ADDR) and the count values (CNT) have a clear relationship corresponding to one another, both may be stored in the same memory area (address). Alternatively, they may each be stored over a plurality of memory areas.

After the count values of the respective terminals have been determined in the memory 23, the contents are extracted to the external PC 5 through the RS232C cable 24. In the PC 5, an operation is performed through its internal processing means to determine the terminal-connected position, i.e., the distance x (m) for each terminal in accordance with the count value. When it is done, the number of different terminal addresses is calculated, and the calculations obtained are used as the number of terminals. In accordance with the results of the operation performed, the physical constitution diagram is displayed by the display means on a display screen in the form of graphic and character data. Of course, the data may be outputted as a print.

A method of calculating the distance x will be briefly described. The following relationship is obtained from the timing diagram shown in FIG. 2.

$t3+t1=T$ (a total of the time during which the data from the terminal 14 reaches the both adapters 1 and 2)

$t4-(t1+t\alpha)=T$

Counter operating time tc $=t4-(t3+t\beta)$ $=[T+(t1+t\alpha)]-[(T-t1)+t\beta]$ $=T+t\alpha-t\beta$ Here, since $t\alpha=t\beta$, it follows that $tc=2t1$.

Based on the above relationship and when the propagation time on the bus per meter is regarded as 5 (ns), the time t1 (ns) corresponding to the propagation time on the distance x (m) is as follows.

$t1=x\times 5(ns)=tc/2$

That is, the distance x is $x(m)=t1/5=tc/10$ (1)

The counter operating time tc is readily determined from the counter time interval (10 ns) and the counter value.

In accordance with the count value of each terminal, the PC 5 successively determines the terminal-connected position x according to the expression (1). The whole length L of the bus is, as previously stated, determined from L (m)=count value (CNT0)/2. The distance between the terminals is also determined from the difference in the respective terminal-connected positions.

Figure 5:
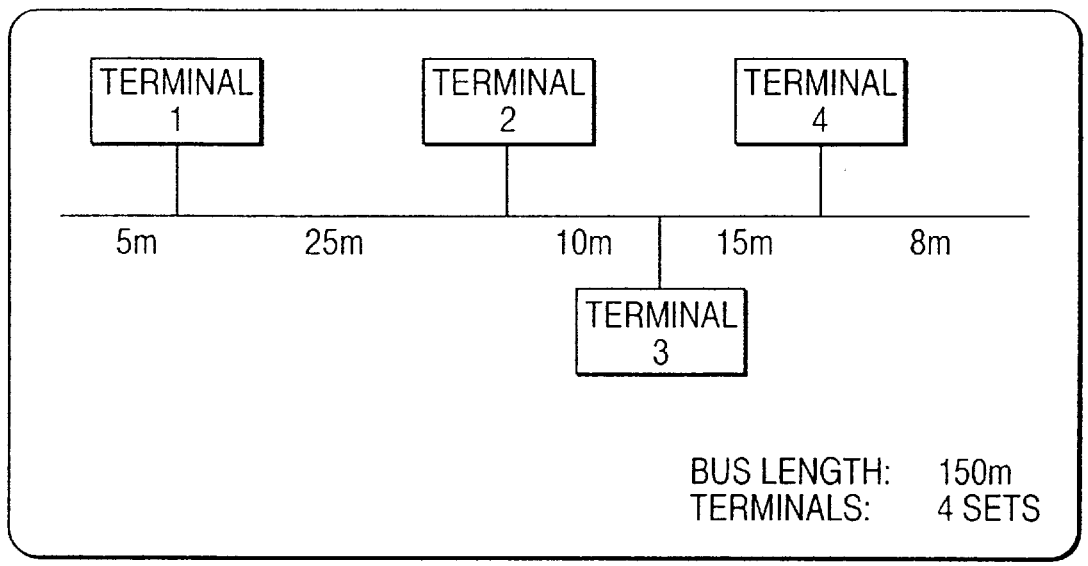
FIG. 5 illustrates an example of a physical constitution diagram of a LAN system, prepared by the system shown in FIG. 1.

FIG. 5 illustrates an example of a physical constitution diagram prepared in accordance with the newest physical constitution information thus obtained. It will be obvious to those who are skilled in the art that a diagram expressing as parameters the number of terminals and distances between terminals as shown in FIG. 5 can be prepared by carrying out relatively simple programming on the PC 5.

In the example described above, the physical constitution information of each terminal is collected during the normal operation of the LAN. Alternatively, the data may be experimentally transmitted when necessary, from a terminal from which the information has not been collected, whereby any intended information can be appropriately collected.

The terminal resistances are provided inside the adapters 1 and 2. They may be provided separately from the adapters.

A second embodiment of the present invention will be described below. According to this embodiment, when collision of the data occurs on the bus, the collision is detected to specify the terminals from which such data are transmitted, and, when noise is generated, the position at which the noise is generated is detected. Here, these are detected on condition that the whole length (m) of the bus and the position of the bus at which each terminal (containing HUB, a bridge and a router) is physically connected are known. Such physical constitution information can be automatically determined by utilizing the first embodiment. However, it may be determined by another method.

Figure 8:
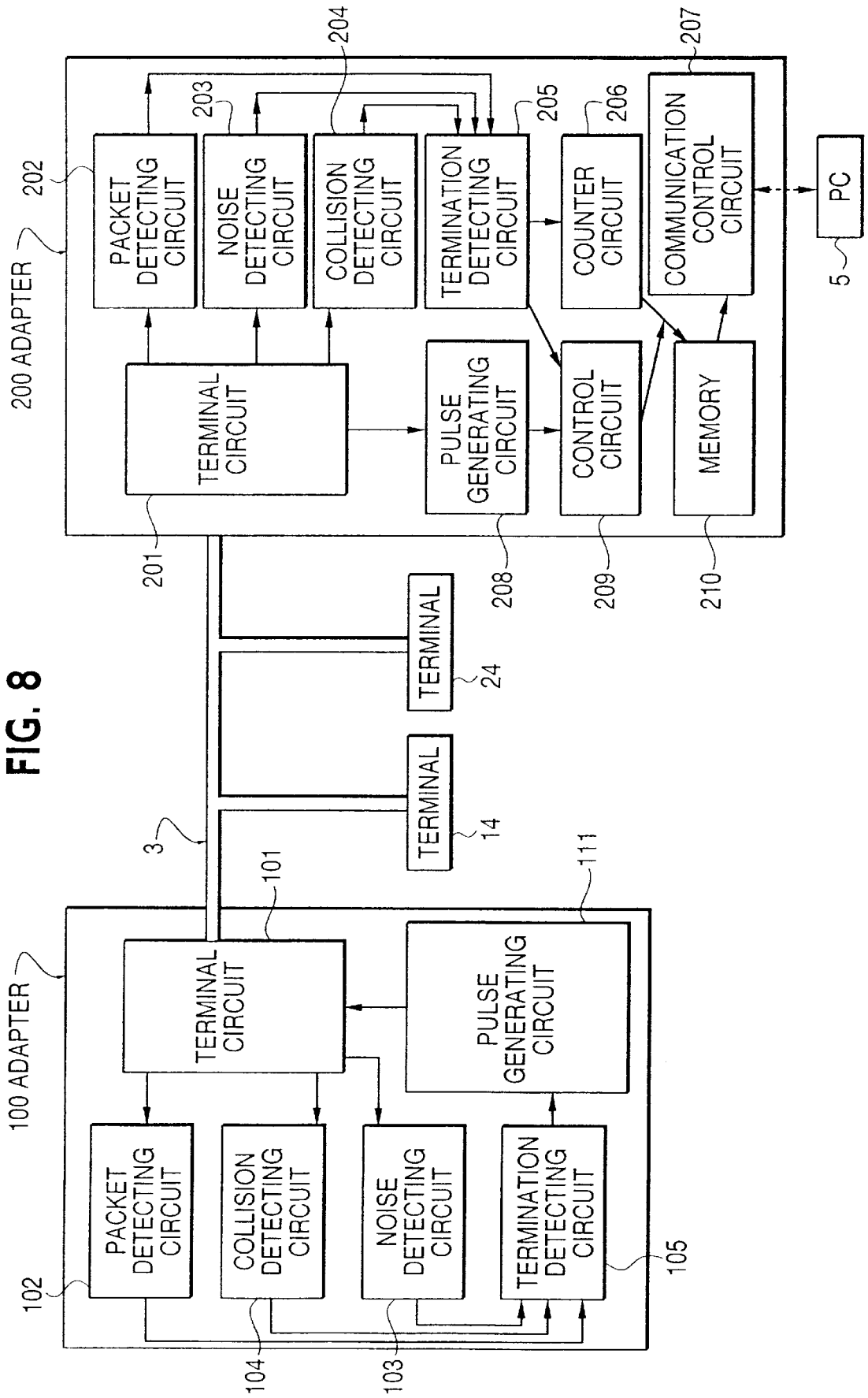
FIG. 8 is a block diagram showing an example of the constitution of a LAN system, for detecting collision terminals and detecting noise-generated position according to the present invention.

FIG. 8 illustrates a system configuration of the second embodiment. The same constituents as those shown in FIG. 1 are denoted by the same reference numerals. Like those of FIG. 1, adapters 100 and 200 are respectively connected to both ends of a LAN cable 3. At known positions of the LAN cable 3, terminals 14 and 15 and another terminal (not shown) are connected. A personal computer (PC) 5 is connected to the adapter 200 when necessary, as in the case of FIG. 1. The data collected by the adapter 200 are extracted, and the collision terminal is specified from the data obtained and the known physical constitution information.

One adapter 100 is constituted of a terminal circuit (corresponding to the terminal resistance shown in FIG. 1) 101, a packet detecting circuit 102, a noise detecting circuit 103, a collision detecting circuit 104, a collision-noise termination detecting circuit 105 and a pulse generating circuit (corresponding to the pulse transmitting circuit 19 shown in FIG. 1) 111. These circuits function as will be described later. The packet detecting circuit 102 contains the synchronizer 27 and terminal address detecting circuit 20 shown in FIG. 1.

The other adapter 200 is constituted of a terminal circuit 201, a packet detecting circuit 202 (equivalent to the packet detecting circuit 102), a noise detecting circuit 203 (equivalent to the noise detecting circuit 103), a collision detecting circuit 204 (equivalent to the collision detecting circuit 104), a collision termination detecting circuit 205 (equivalent to the termination detecting circuit 105), a counter circuit 206 (corresponding to the counter circuit 21 shown in FIG. 1), a communication control circuit 207, a pulse detecting circuit 208 (corresponding to the pulse detecting circuit 22 shown in FIG. 1), a control unit 209, and a memory 210 (corresponding to the memory 23 shown in FIG. 1).

With regard to the packet detecting circuit, collision detecting circuit, packet termination detecting circuit and collision termination detecting circuit, a commercially available dedicated IC internally provided with these may be used, as exemplified by DP8392C, manufactured by National Semiconductor Co.

Here, methods of detecting the packet and detecting the collision signal will be described.

Once the packet is sent out onto the coaxial cable 3, a negative pulse signal as shown in FIG. 12 (a) is inputted to the adapters 100 and 200. This signal turns into a signal (b) through a low-pass filter (not shown; 4-Pole Bessel Low-pass Filter). The output from this low-pass filter is used in the packet detecting circuits 102 and 202 and collision detecting circuits 104 and 204, and the filter is disposed at the latter part of the terminal circuits 101 and 201. When the output of this low-pass filter exceeds a first preset threshold value TH1 (e.g., −0.55 to −1.2 V), the circuit can detect that the packet has been inputted. As to the termination of the packet, the packet is regarded as having been terminated at the time no signal is sent, in the case where the signal shown in FIG. 12 (a) is 200 ns.

Meanwhile, the collision of packets is detected by utilizing the fact that a collision signal having a large signal level is generated as a result of the collision of packets and consequently the output of the low-pass filter becomes larger. More specifically, as shown in FIG. 12 (c), the occurrence of collision is detected when the output of the low-pass filter exceeds a second threshold value (e.g., −1.53 V). Thus, the output signal level of the low-pass filter may be checked using the two threshold values, so that it becomes clear whether normal packets are received or a collision has occurred. The termination of collision is detected at the time the output of the low-pass filter again crosses the threshold value T2 at which the collision was detected.

The jam signal itself has a signal level equal to the packet, and hence the jam signal and the termination thereof are detected in the same manner as the packet.

Now, the operation to specify the collision terminal (the terminal from which the data having collided are transmitted) in the system shown in FIG. 8 will be described. Now, assume that a packet signal has been sent out from any terminal (e.g., the terminal 14). The packet thus sent out is transmitted toward both ends of the LAN cable 3. Assume also that a packet has been outputted from another terminal (e.g., the terminal 24) at almost the same time. The latter packet is similarly transmitted toward both ends of the LAN cable. On that occasion, the packet signals collide with each other on the LAN cable 3. First, the packet from the terminal 14 reaches the adapter 100 connected to one end of the LAN cable 3, and thereafter the collision signal arrives. These packet signal and collision signal are detected by the packet detecting circuit 102 and the collision detecting circuit 104, respectively, provided in the adapter 100, and the respective detected signals are outputted. These detected signals are inputted to the packet-collision termination detecting circuit 105. This collision termination detecting circuit 105 detects that the respective signals have disappeared, and outputs a pulse output starting signal. This pulse output starting signal enters the pulse generating circuit 111, and the pulse generating circuit 111 injects a stated pulse onto the LAN cable 3.

Meanwhile, the packet signal and the collision signal also successively reach the adapter 200. This packet enters the packet detecting circuit 202 and collision detecting circuit 204 provided in the adapter 200, and the respective detected signals are outputted. These detected signals are inputted to the packet-collision termination detecting circuit 205. The collision termination detecting circuit 205 detects that the respective signals have disappeared, and outputs a packet termination signal and a collision termination signal. The collision termination signal makes the counter circuit 206 start the count of time. Also, the signal on the LAN cable 3 has entered the pulse detecting circuit 208, and this circuit 208 detects the pulse transmitted from the adapter 100 at a stated slice level by means of a comparator (not shown) after the termination detecting circuit 205 has detected the termination of collision, and outputs the detected signal. At this stage, if the pulse has the same level as the packet level and has a pulse width of 100 ns, the pulse overlaps with the signal and hence the adapter 200 can not distinguish the pulse. As a method for preventing such a difficulty, the pulse level may be adjusted or the pulse width may be adjusted. In the present embodiment, the recognition of a pulse can be made possible by making the pulse level equal to the collision signal (e.g., −4.0V). This detected signal enters the control unit 209, and the control unit 209 records the, counter value of the counter circuit 206 in the stated area of the memory 210. When the collision termination signal causes the counter circuit 206 to operate, the control unit 209 also records in the memory the counter value at the time it received the packet termination signal. This recorded counter value is processed by the PC 5 connected to the adapter 200 to thereby specify the terminal having caused the collision.

Figure 9:
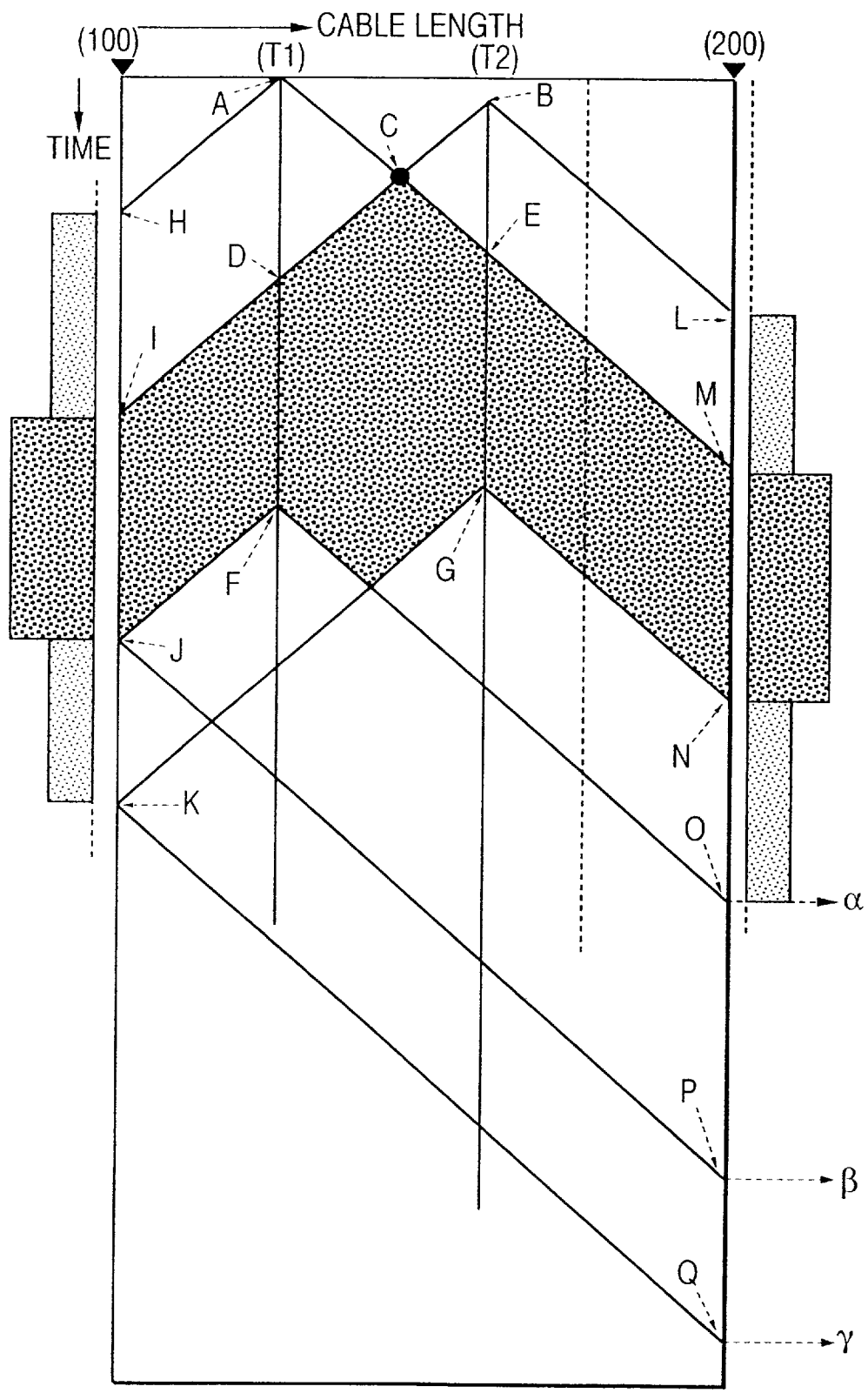
FIG. 9 is a timing diagram for illustrating the principle of how the detection of collision terminals is carried out in the system shown in FIG. 8.

How the collision terminal can be specified in accordance with the count value thus collected will be described with reference to the FIG. 9 timing diagram. The abscissa of FIG. 9 corresponds to the entire length of the LAN cable 3, where terminals T1 and T2 having caused the collision of packets are disposed on the cable at its known positions. The ordinate of FIG. 9 represents time, where the lapse of time is plotted downward. What terminals of the LAN system are the terminals T1 and T2 having caused the collision of packets is determined in the following way.

Now, assume that the terminal T1 has sent out a packet at point A and the terminal T2 has sent out a packet at point B with a slight delay. Then, both packets collide at point C, where the terminal T1 detects at point D the occurrence of collision and the terminal T2 detects at point E the occurrence of collision. Both terminals stop transmitting the packets upon detection of the occurrence of collision, and output 32-bit jam signals with any desired pattern up to points F and G in order to make the occurrence of collision well known to all the terminals connected to the LAN cable 3 according to the LAN standard (IEEE 802.3). Under such a situation, the adapter 100 detects the packet at point H by means of the packet detecting circuit 102 and detects at point I the occurrence of collision by means of the collision detecting circuit 104. It further detects at point J the termination of collision by means of the termination detecting circuit 105 to output a pulse, and detects at point K the termination of the jam signal (which is also a signal equivalent to the packet) of the termination detecting circuit 105 to output a pulse. Also, the adapter 200 detects the packet at point L by means of the packet detecting circuit 202 and detects at point M the occurrence of collision by means of the collision detecting circuit 104. Subsequently, it detects at point N the termination of collision by means of the termination detecting circuit 205 to make the counter circuit 206 start the count. It further detects at point O the termination of jam signal by means of the termination detecting circuit 205 to record the counter value α obtained here. It still further detects at point P the pulse transmitted from the adapter 100 to record the counter value β obtained here, and detects at point Q a second pulse transmitted from the adapter 100 to record the counter value γ obtained here. Thereafter, the count of the counter circuit 106 is stopped and reset. From the count values thus recorded, the terminals T1 and T2 are specified in the following way.

Distance from the adapter 100 to the terminal $T1 = k \times (\beta - \alpha)$

Distance from the adapter 100 to the terminal $T2 = k \times \gamma$

In the above expression, k is a constant (which may vary depending on the cable) relating to transmission velocity. Stated specifically, k=V/2 when the cable propagation velocity is represented by V (m/ns).

Since the position of the terminal connected on the LAN is known, the terminal positioned at the distance thus determined is specified as the terminal being sought.

A specific example of specifying the collision terminal will be shown below.

In this example, as shown in FIG. 11, four sets of terminals 31 to 34 are connected to a coaxial cable of 100 m in overall length, at positions that are 20 m, 40 m, 60 m and 80 m distant from one end of the cable. HITACHI RG-58A/U is used as the coaxial cable which is a LAN cable. This cable has a signal propagation velocity of 1 m per about 5 ns. The LAN also has a signal speed of 100 ns/bit.

Figure 13:
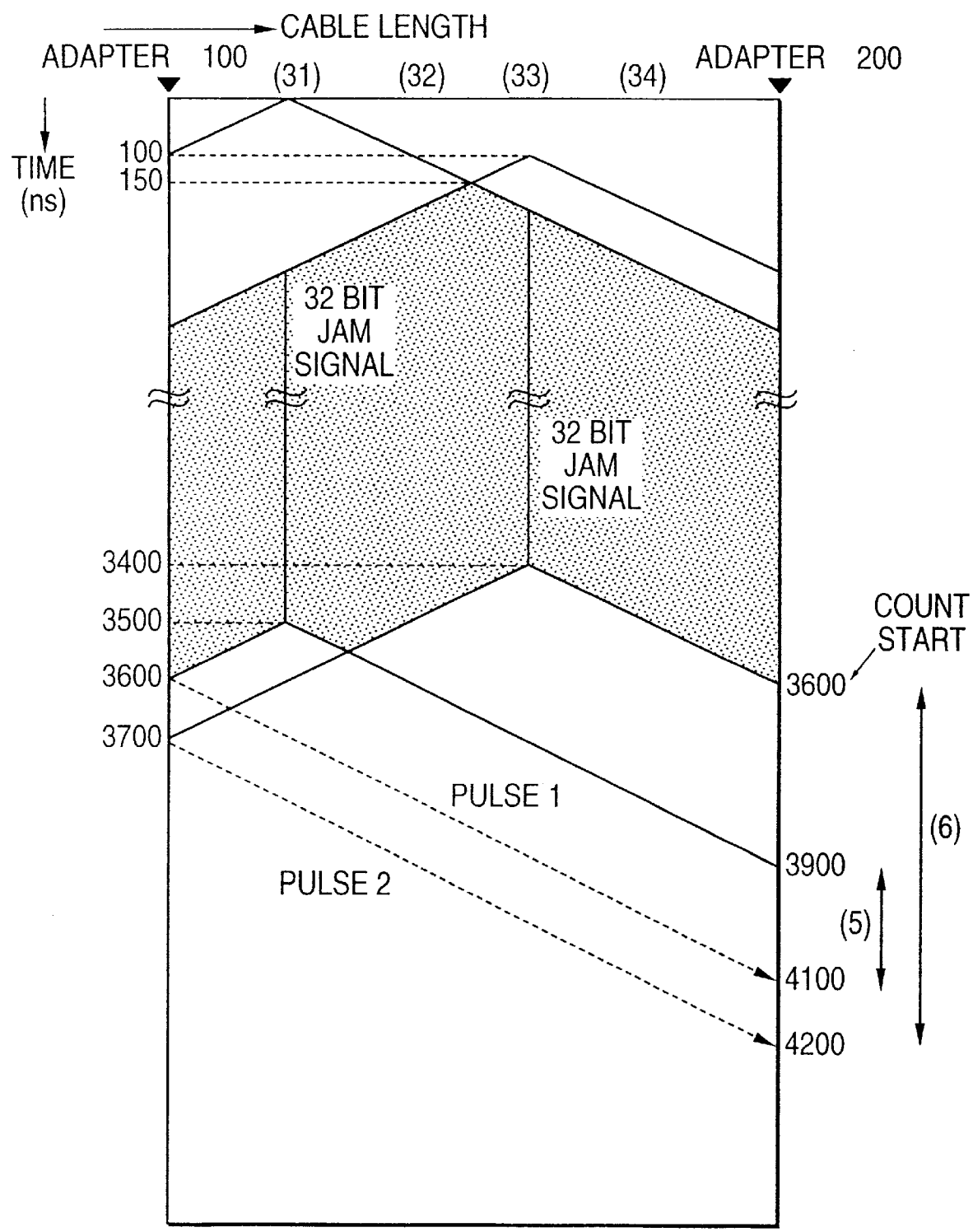
FIG. 13 is a timing diagram for illustrating how the detection of collision is carried out in the LAN configuration shown in FIG. 11.

A timing diagram formed by applying the FIG. 9 timing diagram to the LAN configuration shown in FIG. 11 is shown in FIG. 13. According to the LAN standard (IEEE 802.3), when a packet is sent out, the packet is sent out 9.6 µs later making sure that no signal is carried on the LAN cable. Hence, a non-signal period of at least 9.6 µs is present between a packet and another packet. When two sets of terminals sense the cable during that time, the two terminals both judge that the LAN cable is empty, and send out a packet after 9.6 µs. As the result, the collision of packets occurs on the LAN cable.

Figure 14:
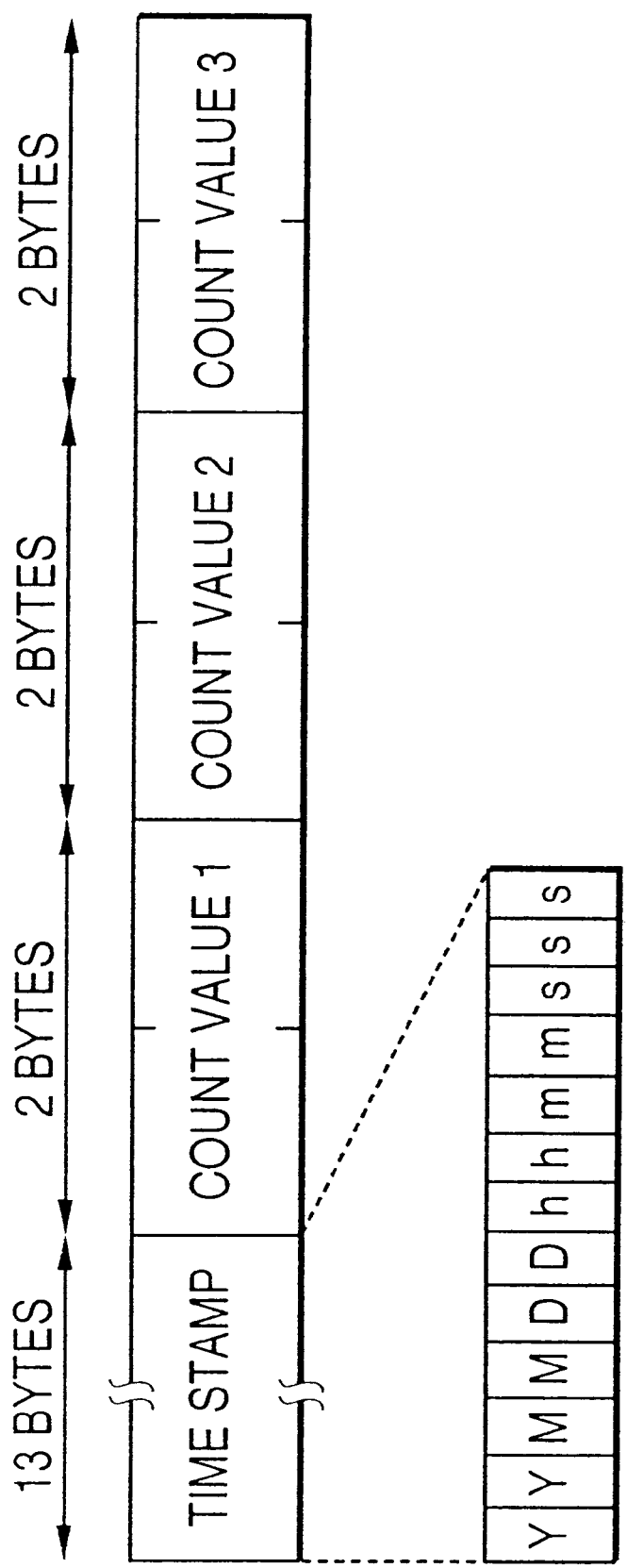
FIG. 14 illustrates a format of the data stored in a memory at the time of the detection of collision.

FIG. 13 illustrates an instance where the terminals 31 and 33 sense the LAN cable at a time difference of 100 ns and have sent out packets. As to the time plotted on the ordinate, the point of time at which the terminal 31 has sent out a packet is regarded as 0. The collision of the packets of the terminals 31 and 33 occurs at a point of time of 150 ns. The signal of this collision is propagated and is recognized by the terminals 31 and 33. The terminals 31 and 33 stop outputting the packets and instead send out 32-bit jam signals (having the same signal levels as the packets and having any desired patterns) as previously stated, in order to maintain the collision signal. The hatched area in FIG. 13 is a collision signal area. The adapter 100 detects at a point of time of 3,600 µs the termination of collision and outputs a pulse 1 onto the LAN cable. Thereafter, at a point of time of 3,700 µs, the adapter 100 detects the termination of the jam signal and sends out a pulse 2. The adapter 200 detects the termination of collision and starts the counter circuit 206 of, for e.g., 100 MHz (a counter that counts up in 10 ns units). The adapter 200 stores three counter values 1, 2 and 3 obtained at the point of time where the termination of collision has been detected and at the point of time where the two pulses 1 and 2 have been detected, which values are stored under the format as shown in FIG. 14, putting time stamps in a memory area exclusively used for collision data. Here, the time stamps contain values of years, months, days, hours, minutes and seconds (including the first decimal) at those points of time. In FIG. 14, the count value 1 indicates a count value at the point of time where the adapter 200 has detected the termination of collision; the count value 2, a count value at the point of time where the adapter 200 has detected the pulse 1; and the count value 3, a count value at the point of time where the adapter 200 has detected the pulse 2. These data are collected using the PC 5 connected to the adapter 200, and the time shown by each of (5) and (6) in FIG. 13 is calculated from the count values to determine the distance from the adapter 100 to the terminal having caused the collision. The distance thus determined is compared with the known physical constitution information stored in the PC 5, like the one collected in the first embodiment, whereby the terminal can be specified. In the case of the present example, the time (5) is 200 ns and the time (6) is 600 ns. Thus, it becomes clear from the propagation velocity of 1 m per 5 ns that the terminals having caused the collision are the terminals connected at 200/(5*2)=20 m and 600/(5*2)=60 m from the adapter 100. This is compared with the physical constitution information, thus the terminals having caused the collision can be specified to be the terminals 31 and 33.

A method of detecting the noise-generated position using the system configuration shown in FIG. 8 will be described below with reference to FIG. 10.

Figure 10:
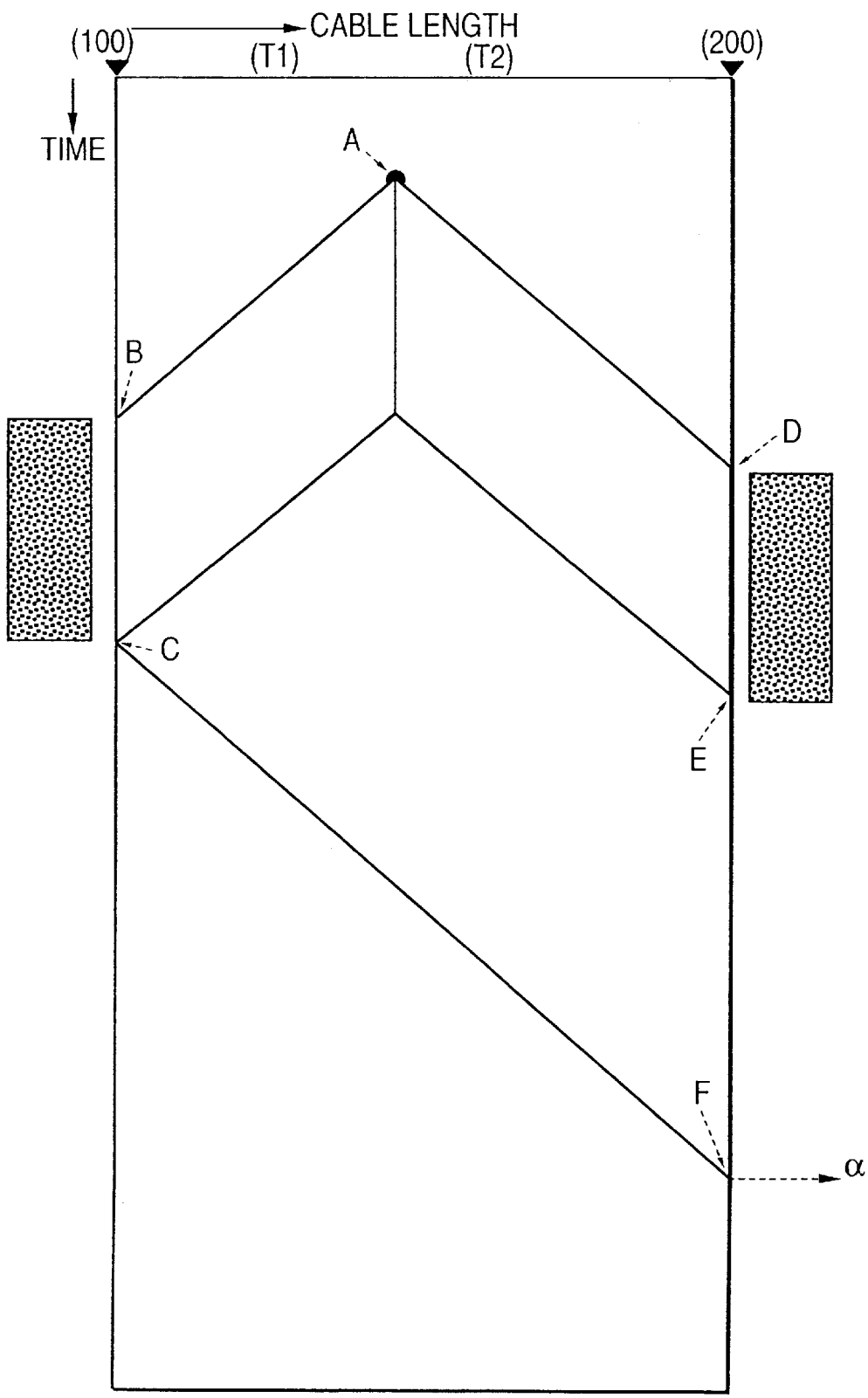
FIG. 10 is a timing diagram for illustrating the principle of how the detection of noise-generated position is carried out in the system shown in FIG. 8.

Now, assume that noise has been generated at point A in FIG. 10. In this instance, the adapter 100 detects the noise at point B by means of the noise detecting circuit 103. Since the signal on the LAN is a signal having a negative polarity and in the meantime the noise is a signal having positive and negative polarities, the generation of noise can be detected by monitoring the signal having a positive polarity. The adapter 100 detects point C having become free of noise, by means of the termination detecting circuit 105 and sends out a pulse. Meanwhile, the adapter 200 detects the same noise at point D by means of the noise detecting circuit 203 and detects at point E the termination of noise by means of the termination detecting circuit 205. At this point E, the adapter 200 makes the count of the counter circuit 206 start in order to measure the time. It further detects at point F the pulse transmitted from the adapter 100, by means of the pulse detecting circuit 208 to record the count value α obtained here. From the count value thus recorded, the noise-generated position is detected in the following way.

Distance from the adapter 100 to the noise-generated position= $k \times \alpha$ The value of k is as defined previously.

In the foregoing, the first embodiment where the physical constitution information of the LAN is automatically detected and the second embodiment relating to how to specify the collision terminal and how to detect the noise position have been described separately. Alternatively, these may be employed simultaneously in the same system. Also, the same constituents of the adapters as shown in FIGS. 1 and 8 can be used in common.

POSSIBILITY OF INDUSTRIAL UTILIZATION

The present invention can be utilized in bus type LAN systems, where the information relating to the position where each terminal is connected can be automatically collected during the operation of a usual LAN system and, when necessary, physical constitution diagrams can be automatically prepared using a personal computer in accordance with the information thus collected. Accordingly, the physical constitution of existing LAN systems and their configuration diagram can be accurately and quickly grasped and prepared. Also, when the collision of data occurs, it is possible to readily specify the terminal having sent out such data. The noise-generated position on the LAN can also be detected.

We claim:

1. A method of specifying two terminal devices that have transmitted packets having caused a collision in a bus type LAN system to which at least three terminal devices that can transmit packets onto the bus are connected and in which said two terminal devices transmit a jam signal having a preset data length when the packets transmitted from said two terminal devices among said at least three terminal devices collide on the bus and said two terminal devices having transmitted the collided packet receive a collision signal, said method comprising the steps of:

providing first and second adapters at both ends of the bus;

generating at said first adapter a first preset pulse signal when the collision signal is detected and then generating a second preset pulse signal when the termination of the jam signal is detected; and measuring at said second adapter a first time $\alpha$ from a base point when the termination of the collision signal is detected until the termination of the jam signal is detected, a second time $\beta$ from said base point until the first preset pulse signal is received and a third time $\gamma$ until the second preset pulse signal is received;

determining a first distance on the bus in accordance with a difference ($\beta-\alpha$) between the second time and the first time and a bus propagation velocity, and determining a second distance on the bus in accordance with the third time $\gamma$ and the bus propagation velocity; and comparing the first and second distances thus determined, with each known terminal-connected position on the bus of said at least three terminal devices to specify where are the two terminal devices among said at least three terminal devices located on the bus.

2. The method according to claim 1, wherein each of said packets is comprised a preamble, a synchronous flag for synchronization, a header including a destination terminal address and a source terminal address, and data information transmitted from said terminal device connected on the bus.

3. An apparatus for specifying two terminal devices that have transmitted packets having caused a collision in a bus type LAN system to which at least three terminal devices that can transmit packets onto the bus are connected and in which said two terminals transmit a jam signal having a present data length when the packets transmitted from said two terminal devices among said at least three terminal devices collide on the bus and said two terminal devices having transmitted the collided packets receive a collision signal, said apparatus comprising:

a first adapter connected to one end of the bus and a second adapter connected to the other ends of the bus;

said first adapter comprising:
means for detecting a packet and a jam signal;
means for detecting a collision signal; and
means for generating a first preset pulse signal when the collision signal is detected and generating a second preset pulse signal when the termination of the jam signal is detected;

said second adapter comprising:
means for detecting a packet and a jam signal;
means for detecting a collision signal;

means for measuring a first time $\alpha$ from a base point when the termination of the collision signal is detected until the termination of the jam signal is detected, a second time $\beta$ from said base point until the first preset pulse signal is received and a third time $\gamma$ from said base point until the second preset pulse signal is received;

means for storing the time $\alpha$, $\beta$ and $\gamma$ thus measured; and means for determining a first distance on the bus in accordance with a difference ($\beta-\alpha$) between the second time $\beta$ and the first time $\alpha$ and a bus propagation velocity, determining a second distance on the bus in accordance with the third time $\gamma$ and the bus propagation velocity, and comparing the first and second distances thus determined with each known terminal-connected position on the bus of said at least three terminal devices to specify where are said two terminal devices among said at least three terminal devices located on the bus.

4. The apparatus according to claim 3, wherein each of said packets is comprised a preamble, a synchronous flag for synchronization, a header including a destination terminal address and a source terminal address, and data information transmitted from said terminal device connected on the bus.

5. The apparatus according to claim 3, further comprising means for providing a visual display of a physical constitution diagram of said terminal devices in accordance with locations of said terminal devices on the bus.

6. An apparatus for specifying locations of at least two terminal devices along a bus, comprising:

a first adapter connected to one end of the bus, said first adapter comprising:
a packet detector which detects a packet and a jam signal;
a collision detector which detects a collision signal; and
a pulse generator which generates a first preset pulse signal when the collision signal is detected, and generates a second preset pulse signal when the termination of the jam signal is detected;

a second adapter connected to other end of the bus, said second adapter comprising:
a packet detector which detects a packet and a jam signal;
a collision detector which detects a collision signal;
a terminal detector which measures a first time $\alpha$ from a base point when the termination of the collision signal is detected until the termination of the jam signal is detected, a second time $\beta$ from said base point until the first preset pulse signal is received and a third time $\gamma$ from said base point until the second preset pulse signal is received;
a memory which stores the time $\alpha$, $\beta$ and $\gamma$ thus measured; and
a controller which determines a first distance on the bus in accordance with a difference ($\beta-\alpha$) between the second time $\beta$ and the first time $\alpha$ and a bus propagation velocity, determines a second distance on the bus in accordance with the third time $\gamma$ and the bus propagation velocity, and compares the first and second distances thus determined with known terminal-connected locations on the bus of said at least two terminal devices to specify the locations of said at least two terminal devices along the bus.

7. The apparatus according to claim 6, wherein each of said packets is comprised a preamble, a synchronous flag for synchronization, a header including a destination terminal address and a source terminal address, and data information transmitted from said terminal device connected on the bus.

8. The apparatus according to claim 6, further comprising means for providing a visual display of a physical constitution diagram of said at least two terminal devices in accordance with the locations of said at least two terminal devices on the bus.

9. An apparatus for determining locations of terminal devices connected on a bus of a bus type LAN system for packet transmissions, comprising:

a first adapter connected to one end of a bus, which generates a first preset pulse signal when a collision signal is detected, and generates a second preset pulse signal when termination of a jam signal is detected; and a second adapter connected to an opposite end of the bus, which measures a first time from a base point when the termination of the collision signal is detected until the termination of the jam signal is detected, a second time from said base point until the first preset pulse signal is received and a third time from said base point until the second preset pulse signal is received, and which determines locations of said terminal devices along the bus in dependence upon the first, second, and third time measured, a bus propagation velocity and known terminal-connected locations of said terminal devices on the bus.

10. The apparatus according to claim 9, further comprising a computer connected to said second adapter, which provides a visual display of a physical constitution diagram of each of said terminal devices connected on the bus in accordance with said locations determined.

11. The apparatus according to claim 9, wherein said first adapter comprises:

a packet detector which detects a packet and the jam signal;

a collision detector which detects the collision signal; and a pulse generator which generates the first preset pulse signal when the collision signal is detected, and generates the second preset pulse signal when the termination of the jam signal is detected.

12. The apparatus according to claim 11, wherein said packets is comprised a preamble, a synchronous flag for synchronization, a header including a destination terminal address and a source terminal address, and data information transmitted from said terminal device connected on the bus.

13. The apparatus according to claim 9, wherein said second adapter comprises:

a packet detector which detects a packet and the jam signal;

a collision detector which detects the collision signal;

a terminal detector which measures the first time from a base point when the termination of the collision signal is detected until the termination of the jam signal is detected, a second time from said base point until the first preset pulse signal is received and a third time from said base point until the second preset pulse signal is received;

a memory which stores the first, second and third time thus measured; and a controller which determines a first distance on the bus in accordance with a difference between the second time and the first time and a bus propagation velocity, determines a second distance on the bus in accordance with the third time and the bus propagation velocity, and compares the first and second distances thus determined with each known terminal-connected locations on the bus of said at least two terminal devices to specify the locations of said at least two terminal devices along the bus.

14. The apparatus according to claim 13, wherein said packets is comprised a preamble, a synchronous flag for synchronization, a header including a destination terminal address and a source terminal address, and data information transmitted from said terminal device connected on the bus.

* * * * *